United States Patent

Beach et al.

[11] Patent Number: 5,959,056
[45] Date of Patent: *Sep. 28, 1999

[54] RELEASE AGENT FOR ELECTROPHOTOGRAPHIC PROCESS

[75] Inventors: Bradley L. Beach, Lexington; Kathryn E. Dowlen, Georgetown; Terence E. Franey, Lexington; Douglas C. Hamilton, Lexington; Gerald G. Leslie, Lexington; Alexander D. Meade, Lexington; Jing X. Sun, Lexington; Peter E. Wallin, Lexington, all of Ky.

[73] Assignee: Lexmark International, Inc., Lexington, Ky.

[ * ] Notice: This patent is subject to a terminal disclaimer.

[21] Appl. No.: 08/937,454

[22] Filed: Sep. 25, 1997

Related U.S. Application Data

[63] Continuation-in-part of application No. 08/855,374, May 13, 1997.

[51] Int. Cl.$^6$ .................................................... C08G 77/06
[52] U.S. Cl. ............................ 528/15; 399/106; 399/111; 428/172; 528/31; 524/303; 524/123
[58] Field of Search ........................ 528/15, 31; 399/111, 399/106, 320, 330, 333; 428/172

[56] References Cited

U.S. PATENT DOCUMENTS

| | | | |
|---|---|---|---|
| 4,185,140 | 1/1980 | Strella et al. | 428/418 |
| 5,393,521 | 2/1995 | Lance-Gomez et al. | 424/70.12 |
| 5,604,039 | 2/1997 | Chen et al. | 428/447 |
| 5,624,780 | 4/1997 | Nishimori et al. | 430/124 |
| 5,783,719 | 7/1998 | Sun et al. | 528/25 |

FOREIGN PATENT DOCUMENTS

| | | |
|---|---|---|
| 0 527 286 A1 | 2/1993 | European Pat. Off. . |
| 0 527 594 A1 | 2/1993 | European Pat. Off. . |
| 0 641 799 A2 | 3/1995 | European Pat. Off. . |
| 0 772 094 A1 | 5/1997 | European Pat. Off. . |
| 07 244 398 | 9/1995 | Japan . |
| 08 020 724 | 1/1996 | Japan . |
| 1 507 496 | 4/1977 | United Kingdom . |

*Primary Examiner*—Melvyn I. Marquis
*Attorney, Agent, or Firm*—John A. Brady

[57] ABSTRACT

A release agent composition for use in an electrophotographic process is disclosed. This composition includes a specifically-defined heat-stable silicone oil-silicone wax copolymer. The copolymer has a melting point such that it is liquid on the hot fuser roll, but solidifies at room temperature on the printed page. A random silicone copolymer, in the form of a paste or pliable caulk, which is useful for sealing leaks in toner cartridges is also disclosed. Finally, the method for preparing these copolymers is disclosed.

23 Claims, No Drawings

RELEASE AGENT FOR ELECTROPHOTOGRAPHIC PROCESS

This application is a continuation-in-part of U.S. patent application Ser. No. 08/855,374, Beach, et al., filed May 13, 1997.

TECHNICAL FIELD

The present invention relates to electrophotographic printing and specifically is a release agent used on the hot fuser roll in an electrophotographic printing process.

The present invention relates to electrophotographic printing and specifically is a release agent used on the hot fuser roll in an electrophotographic printing process.

BACKGROUND OF THE INVENTION

In the process of electrophotography, the light image of an original to be copied is typically recorded in the form of a latent electrostatic image upon a photosensitive member with a subsequent rendering of that latent image visible by the application of electroscopic marking particles, commonly referred to as toner. The visual toner image can be either fixed directly upon the photosensitive member or transferred from the member to another support, such as a sheet of paper, with subsequent affixing of the image thereto.

In order to fix or fuse electroscopic toner material onto a support member permanently by heat, it is necessary to elevate the temperature of the toner material to a point at which the constituents of the toner become tacky. This action causes the toner to flow to some extent into the fibers or pores of the support member. Thereafter, as the toner material cools, solidification occurs causing the toner material to become bonded firmly to the support member. In electrophotography, the use of thermal energy for fixing toner images onto a support member is old and well known.

One approach to thermal fusing of electroscopic toner images has been to pass the support with the toner images thereon between a pair of opposed roller members, at least one of which is internally heated. During operation of this type of fusing system, the support member to which the toner images are electrostatically adhered is moved through the nip formed between the rolls with the toner image contacting the fuser roll, thereby heating the toner image within the nip. By controlling the heat transfer to the toner, virtually no offset of the toner particles from the copy sheet to the fuser roll is experienced under normal conditions. This is because the heat applied to the surface of the roller is insufficient to raise the temperature of the surface of the roller above the "hot offset" temperature of the toner at which temperature the toner particles in the image areas of the toner liquify and cause a splitting action in the molten toner resulting in "hot offset." Splitting occurs when the cohesive forces holding the viscous toner mass together is less than the adhesive forces tending to offset it to a contacting surface, such as a fuser roll.

Occasionally, however, toner particles will be offset to the fuser roll by an insufficient application of heat to the surface thereof (i.e., "cold" offsetting). This is generally caused by imperfections in the properties of the surface of the roll, or by the toner particles not adhering to the copy sheet as a result of insufficient adhesion forces. In such a case, toner particles may be transferred to the surface of the fuser roll with subsequent transfer to the back-up roll during periods of time when no copy paper is in the nip.

Moreover, toner particles can be picked up by the fuser and/or back-up roll during fusing of duplex copies or simply from the surroundings of the reproducing apparatus. The presence of such wayward toner particles can result in poor copy quality.

Most fusers of the type described above employ some method of applying a release fluid to the hot roll. Because of their inherent temperature resistance and release properties, silicone oils are typically used to prevent toner from adhering to the surface of the fuser roll and thereby degrading image quality and contaminating the fuser surface. The silicone oil also extends the life of the fuser rollers by providing some measure of lubrication to reduce the wear caused by the cumulative action of tens of thousands of pages passing through the pressure nip of the fuser. In order to assure the positive effects of the release fluid, a minimum amount of oil (typically 10–100 micrograms per page) is required.

Since the oil used as a release agent is partially carried away by the paper passing through the fuser system, it is necessary to ensure that the amount of oil dispensed is not so much that objectionable print quality defects are seen. In extreme cases, the surface of the imaged page can become visibly wet or glossy with oil. In cases of duplex printing (i.e., printing on both sides of the page), a more subtle effect is seen. In that instance, oil is carried back through the printing process by duplexed pages and the oil on those pages is deposited on various machine surfaces, including the photoconductor. It has been found that minute amounts of oil, invisible to the eye, can be enough to drastically effect the transfer of toner from the developer roll to the photoconductor. Since the development process depends upon a scrubbing action between the toned developer and the imaged photoconductor to aid in the transfer of toner from the developer to the photoconductor, and since the scrubbing action is induced by a mismatch in surface speed between the developer and the photoconductor, the addition of silicone oil at the interface of the two surfaces reduces the frictional scrubbing force to a level where transfer of toner can be severely impaired. Such print quality defects are very apparent in fine resolution printing. In extreme cases, the lack of toner transfer is seen even in 12 point text as light print. Levels of oil exceeding 100 micrograms per page can cause severe print defects if the distribution of oil across the page is not uniform. Typical print quality defects are white streaks in gray scale, with the streaks parallel to the process direction in areas of high oil concentration. For this reason, the upper limit of oil metering is about 100 micrograms per page.

A typical lubricant metering scheme employed in low-cost desk top printers involves saturating a felt pad constructed of temperature resistant material (such as DuPont's NOMEX Fiber) with silicone oil of a viscosity such that, when combined with the fiber size and density of the felt, the rate of flow out of the felt can be controlled within reasonable limits. Typical construction of a wiper pad includes application of an amount of silicone oil (e.g., 7–8 grams) of viscosity about 30,000 cst (at room temperature) to a precut piece of felt (e.g., fiber diameter 9 microns, felt density ≈55 oz./yd$^2$.), and baking the felt/oil combination at a high temperature to allow the oil to soak into the felt. Before high resolution printing (1200 DPI) and duplex printing, such a scheme was an excellent metering system, controlling oil flow within a range of 50–500 micrograms per page, with reasonable flow uniformity and no image defects. When this metering scheme is used with 1200 DPI and duplex printing, however, the previously acceptable non-uniform distribution of oil produces oil concentrations in some areas that are high enough to result in the above-described print defects.

Another requirement of the oil application system is that the amount of oil dispensed must be consistent during the life of the applicator (typically about 14,000 pages). As previously mentioned, failure to maintain adequate oil flow causes toner to adhere to the fuser and reduces the life of the fuser. Also, low flow allows toner to be collected on the felt applicator; when enough toner accumulates, a mass of toner breaks free and adheres to the page causing another print quality defect called "wiper dump." The felt applicator is a gravity feed system. This means that oil flows out of the felt at a constant rate for a given temperature. Silicone oil continuously flows out of the wiper even if the printer is not printing and is at standby. Thus, if the printer is at standby for a sufficient amount of time, the first page printed will receive an abnormally large amount of silicone oil and show duplex streaks.

In summary, for optimum performance the release agent oil application system must meet the following requirements:

Sufficient and consistent oil flow over the life of the system to prevent adherence of toner to the fuser roll. This extends fuser life and prevents wiper dumps. Minimum flow rate of 10 micrograms per page.

A maximum flow rate of 100 micrograms per page and uniform flow to prevent image defects when printing high resolution images at 1200 DPI and in duplex mode.

U.S. Pat. No. 4,185,140, Strella, et al., issued Jan. 22, 1980, describes polymeric release agents for use on hot fuser rolls in an electrophotographic duplication process. The polymer materials utilized must include functional groups such as carboxy, hydroxy, isocyanate, thioether or mercapto groups. These materials are said to form a thermally stable release layer on the fuser roll which has excellent toner release properties. It is taught that the polymer material may be solid at room temperature, as long as it is a liquid at the temperature of the fuser. The materials disclosed as release agents are not silicone oils or waxes.

The present invention defines release agents which, when used on a hot fuser roll in an electrophotographic process, eliminate the problems described above. The material is liquid on the fusing surface and solidifies on the print medium when cool. It serves as an effective release agent (i.e., it prevents toner from adhering to the surface of the fuser roll and lubricates the fuse roll) and prevents print quality defects which result from the presence of oil on the paper, particularly during duplex printing.

Print quality issues can also arise as the result of toner leaks from the print cartridge. The toner cartridge is a replaceable supply used in printers and photocopiers. Its function is to hold a supply of the toner in a reservoir and then transfer the toner from that reservoir onto the developer roll, where it is present as a monolayer. The toner is then transferred onto the photoconductor in a pattern corresponding to the image to be printed, based on a charge distribution created on the photoconductor surface. Toner cartridges are well-known in the electrophotographic art and are, for example, described in U.S. patent application Ser. No. 08/770,330, Coffey, et al., filed Dec. 20, 1996, now U.S. Pat. No. 5,802,432; incorporated herein by reference.

Careful transfer of the toner is critical to obtaining good printed images. Leaking toner will result in poor image quality, as well as soiling of the user's hands, clothing and office. A particularly troublesome spot on the cartridge, where toner leakage is likely to occur, is at the ends of the developer roll. In fact, toner cartridges frequently utilize specific seals, such as the J-seal, to prevent toner leakage at the ends of the developer roll. Despite that, some leakage still occurs due to variability in cartridge parts and assembly. A liquid or grease seal could be considered for use in the cartridge, for example, at the ends of the developer roll. However, that could cause problems since such materials tend to migrate and migration of the sealant into the print area can cause contamination of the developer roll, the photoconductor and the charge roll, thereby causing print defects.

Therefore, it is a further object of the present invention to provide a silicone copolymer which, when formulated to have a paste or caulk-like consistency, serves as an effective sealant for use on toner cartridges, which does not migrate, is easy to apply and can be spread as a thin layer.

SUMMARY OF THE INVENTION

The present invention relates to a release agent composition suitable for use on the hot fuser roll of an electrophotographic process, comprising an effective amount (typically from about 50 to about 100 percent of the composition) of a heat-stable silicone copolymer having the formula

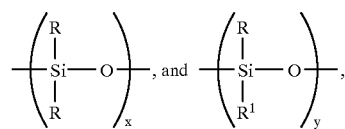

wherein (i) each R is independently a $C_1$–$C_6$ alkyl, (ii) each $R^1$ is independently selected from the group consisting of a $C_2$–$C_{14}$ alkyl and a $C_{15}$–$C_{60}$ alkyl, with the proviso that from about 70% to about 100% of all $R^1$ groups are $C_{15}$–$C_{60}$ alkyl, and (iii) x represents from about 75.0 to about 98.5 mole percent, and y represents from about 1.5 to about 25.0 mole percent of the silicone copolymer based on total moles of the silicone copolymer. Preferred copolymers are random copolymers which have a molecular weight of from about 80,000 to about 250,000. Preferred copolymers are terminated by

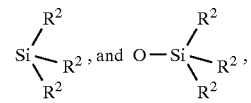

wherein $R^2$ is $C_{1-6}$ alkyl or aryl. Fuser rolls which are coated with this release agent composition, felt pads impregnated with the release agent composition, and the silicone copolymers themselves are also claimed.

The present invention also encompasses a method of making a silicone random copolymer comprising the reaction of a methylhydrosiloxane, such as polydimethylsiloxane-co-polymethylhydrosiloxane (PDMS-co-PMHS) prepolymer, with a $C_{15}$–$C_{60}$ 1-alkene, such as mixed chain 1-alkenes having $C_{30}$–$C_{45}$ as the predominant chain lengths, by adding the catalyst, preferably platinum, to the reaction mixture in portions throughout the reaction. This method allows the reaction to go to a greater degree of completion than if the total amount of catalyst is added to the reaction mixture at one time.

DETAILED DESCRIPTION OF THE INVENTION

The key element of the present invention is a silicone copolymer, especially a random silicone copolymer, having components comprising alkyl methyl siloxane and dimethylsiloxane. This polymer has melting point and viscosity characteristics such that it is liquid on the heated fusing roll surface in an electrophotographic process, but solidifies as it cools on the print surface (i.e., the paper). The precise melting point and viscosity characteristics can be selected and optimized based on the particular dispenser and fuser system to be used.

Organosilicone waxes are well known and are used extensively in the cosmetics industry. However, none of these commercial waxes has the properties which render it useful as a release agent on a fuser roll. A silicone wax must meet the following requirements to be useful as a release agent in a laser printer:

High thermal stability. The wax can have no odor throughout the life of the composition and should not appreciably change physical properties, such as viscosity.

The wax must have a melt viscosity of from about 2,000 to about 10,000 centipoise, preferably from about 3,000 to about 7,000 centipoise, most preferably about 3,500 cps, at about 93° C. This matches the silicone oil viscosity at fusing temperature and allows the wax to be directly substituted into the felt pad dispensing system.

The wax must have a melting point between about 45° C. and about 80° C. If the melting point is below about 45° C., the wax will not solidify when the printer is running at full speed and the cartridge is hot; thus, duplex streaks can occur. If the melting point is above 80° C., the wax will solidify on the backup roll when printing heavy media and collect paper dust and toner which could cause the media to wrap the backup roll.

At standard flow rates, the wax must not produce streaks on transparencies. This is accomplished by having a flow rate of less than about 800 micrograms per page.

The copolymer utilized as the release agent in the present invention comprises structural units represented by the formulae given below. These copolymers may be block copolymers or random copolymers, although random copolymers are preferred.

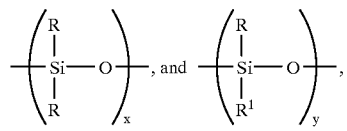

In these formulae, the x portion of the molecule has the properties of a silicone oil, and the y portion of the molecule has the properties of an aliphatic hydrocarbon wax. x represents the molar percent of the copolymer which comprises the silicone oil moieties; x is from about 75.0 to about 98.5 mole percent, preferably from about 85.0 to about 98.0 mole percent, most preferably about 97 mole percent. y represents the molar percent of the copolymer which comprises the silicone wax portion; y has a value of from about 1.5 to about 25.0 mole percent, preferably from about 2.0 to about 15.0 mole percent, most preferably about 3.0 mole percent. These percentages are based on total moles of the silicone copolymer. In preferred polymers, the molar ratio of x:y is from about 15:1 to about 70:1, preferably from about 25:1 to about 50:1, more preferably from about 30:1 to about 45:1, and is most preferably about 32:1. Each of the $R^1$ groups is independently selected from $C_2$–$C_{14}$ alkyl and $C_{15}$–$C_{60}$ alkyl, with the proviso that from about 70% to about 100% (by weight) of all $R^1$ groups are $C_{15}$–$C_{60}$ alkyl and the remainder of the $R^1$ groups are $C_2$–$C_{14}$ alkyl (preferably hexyl). Low levels of hydride (i.e., less than about 10% of the original hydride content) may be tolerated in $R^1$. Both of the alkyl components may be halogenated, preferably fluorinated. It is preferred that the major component in $R^1$ be $C_{30}$–$C_{45}$ alkyl, most preferably $C_{36}$ alkyl. An example of such a material is Gulftene 30+, commercially available from Chevron. Each R is independently selected from $C_1$–$C_6$ alkyl, and is preferably methyl.

Within the ranges of x and y, defined above, the release agent copolymers may be optimized to have specific desirable characteristics for different applications. Thus, a copolymer having x/y equal to about 97/3 may be particularly useful when a printer does both transparencies and duplexing. A copolymer having x/y equal to about 95/5 may be particularly useful where heavy duplexing is required. In the preferred copolymers, x/y (molar ratio) is from about 95/5 to about 97/3.

Preferred copolymers are terminated with the following groups

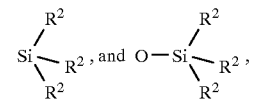

wherein each $R^2$ is independently selected from $C_1$–$C_6$ alkyl or aryl groups, and is preferably methyl.

The copolymer should have a molecular weight (weight average) of from about 10,000 to about 1,000,000, preferably from about 80,000 to about 250,000, more preferably from about 80,000 to about 150,000, most preferably about 110,000. Importantly, the copolymer must be heat-stable. By "heat-stable" is meant that the copolymer can be held at 210° C. for three months with no significant change in color, odor, viscosity or molecular weight.

The release agent composition of the present invention comprises from about 50% to about 97%, preferably from about 75% to about 95%, and most preferably about 91% of the copolymer component described above. The melt viscosity of the composition is particularly important because it is one of the major factors in determining the rate at which the release composition is dispensed onto the fusing roll. The viscosity of the polymer is optimized for the particular dispensing means used. Typically, the melt viscosity of the composition should be from about 2,000 to about 10,000 centipoise at about 93° C., preferably from about 3,000 to about 7,000 centipoise at about 93° C., and most preferably about 3,500 centipoise at about 93° C. The melting point of the release agent composition is also critical because it is the melting point that will determine whether the composition is actually a liquid on the fuser roll and a solid when cooled on the printed paper. The composition should, therefore, have a melting point of from about 45° C. to about 80° C., preferably from about 65° C. to about 80° C., and most preferably about 72° C.

The melt viscosity of the composition may be adjusted in several ways to make sure that it falls within the required range and is optimized within that range for the particular electrophotographic device involved. Two ways to adjust the viscosity is to control the viscosity of the hydride siloxane copolymer by using a chainstopper, or by controlling the level of crosslinking of the copolymer while it is being formed. Those processes will be described below as part of the method for manufacturing the copolymer. Another way to adjust the viscosity is to add a viscosity control agent to the composition. When used, these agents generally comprise from about 0.5% to about 30%, preferably from about 10% to about 25%, and most preferably about 20% of the composition. The particular agent selected may either be added to increase the viscosity or decrease the viscosity of the composition. Examples of useful viscosity modifying agents include amorphous (fumed) silica (especially amorphous silica having a hexamethyldisiloxane surface treatment), silicone oil, and mixtures thereof. The preferred viscosity control agent is silicone oil, 30,000 centistoke. In addition to adjusting the viscosity of the composition, the silicone oil also enhances the lubricating ability and adjusts the flow rate of the composition.

Since the release agent compositions of the present invention are used under a variety of temperature conditions (the high temperatures of the fuser roll as well as ambient room temperature) it is important that the composition, and particularly the copolymer, be stable so as to eliminate any odor, decomposition and crosslinking problems which may occur. This may be accomplished by adding an antioxidant to the composition to provide thermal stability at the fusing temperatures. When used, the antioxidant generally comprises from about 3% to about 20%, preferably from about 5% to about 13%, and most preferably about 9% of the composition. Although the antioxidant is important to achieve composition stability, if it is used at too high levels, undesired "foil streaks" may be seen on printed copies. Any conventional antioxidant may be used. Mixtures of antioxidants which operate by differing mechanisms are preferred. Examples of such useful antioxidants include the following classes of materials:

(a) free radical scavengers—such as hindered phenols;

(b) phosphite materials; and (c) hydroperoxide decomposers—such as thiodipropionate materials; and (d) mixtures of the foregoing materials.

A particularly preferred mixture of antioxidants includes Irganox 1010 (a hindered phenol type antioxidant, commercially available from Ciba Geigy), Cyanox STDP (distearylthiodipropionate, commercially available from Cytek Industries), and Mark 2112 (a high temperature phosphite antioxidant, commercially available from Witco Corp.).

In another aspect of the present invention, an organosiloxane material. particularly a silicone copolymer having the following structural units may be used as a sealant, for example, on toner cartridges:

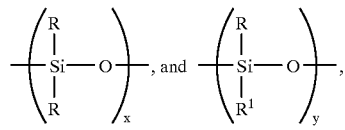

These copolymers may be block copolymers or random copolymers, although random copolymers are preferred. In these formulae, x can be from 0 to about 99.5 mole percent, although it preferably is from greater than about 98.5 to about 99.5, more preferably from about 98.8 to about 99.5, more preferably from about 99.0 to about 99.2, and most preferably about 99.0, mole percent of the copolymer. y can be from about 0.5 to about 100 mole percent of the copolymer, although it preferably is from about 0.5 to less than about 1.5, more preferably from about 0.5 to about 1.2, more preferably from about 0.8 to about 1.0, and most preferably about 1.0 mole percent of the copolymer. Each of the $R^1$ groups is independently selected from $C_2$–$C_{14}$ alkyl and $C_{15}$–$C_{60}$ alkyl with the proviso that from about 70% to about 100% (by weight) of the $R^1$ groups are $C_{15}$–$C_{60}$ alkyl group and the remainder of the $R^1$ groups are $C_2$–$C_{14}$ alkyl (preferably hexyl) groups. Low levels of hydride (i.e., less than about 10% of the original hydride content) may be tolerated in $R^1$. Both of the alkyl components may be halogenated, preferably fluorinated. It is preferred that the major component in $R^1$ be $C_{30}$–$C_{45}$ alkyl, most preferably $C_{36}$ alkyl. An example of such a material is Gulftene 30+, commercially available from Chevron. Each R is independently selected from $C_1$–$C_6$ alkyl, and is preferably methyl. The copolymer should also preferably be heat-stable.

Preferred polymers are terminated with the following groups

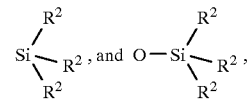

wherein each $R^2$ is independently selected from $C_1$–$C_6$ alkyl or aryl groups, and is preferably methyl.

The molecular weight (weight average) of the copolymer is from about 10,000 to about 1,000,000 preferably from about 80,000 to about 250,000, more preferably from about 80,000 to about 150,000, most preferably about 110,000. Rather than a wax, which is the consistency of the previously described copolymer, the copolymer useful as a sealant has the consistency of a paste or a pliable caulk. The sealant copolymer has a viscosity of from about 3,000 to about 7,000 centipoise at about 93° C. For each particular sealant copolymer, it is within the knowledge of one of ordinary skill in the art to vary the values of x and y and the copolymer's molecular weight to achieve the desired viscosity. The copolymer may be used in combination with antioxidants, as described above.

This silicone copolymer material is useful for sealing leaks, for example in a toner cartridge holding dry powder toner, especially at the ends of the developer roll. The structure of such cartridges is well-known in the art as, for example, disclosed in U.S. patent application Ser. No. 08/770,330, Coffey, et al., filed Dec. 20, 1996, now U.S. Pat. No. 5,802,432; incorporated by reference herein. To accomplish this sealant function an effective amount (from about 5 mg to about 100 mg, preferably about 40 mg) is placed on each J-seal extending downward from the upper junction with the Mylar lower developer seal to cover the entire junction of this Mylar lower developer seal and the plastic housing side plate. The developer roll is then installed and turned, wetting the surface of the J-seat, lower developer roll seal end, and the end surfaces of the developer roll with the copolymer. The copolymer is easy to apply. This thin layer of the copolymer acts to effectively seal toner leaks and the copolymer does not migrate into the print area, in use.

The copolymers used in the present invention may be synthesized by any method known in the art. The steps generally will include the copolymerization of cyclic siloxane (D4) and silicone hydride components to form a silicone prepolymer and then grafting the long chain alkene group onto that prepolymer.

An example of a reaction which can be used to accomplish this follows:

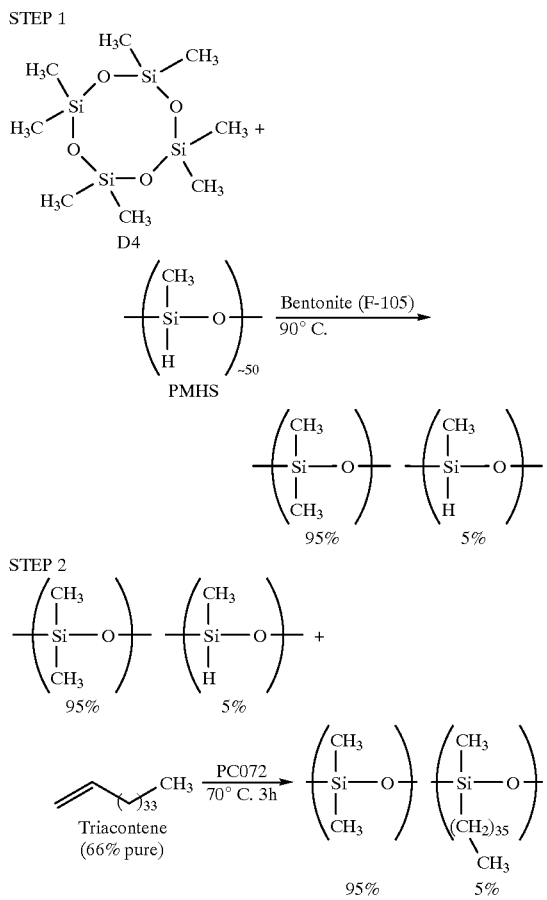

Step 1 Reaction

In a 1000 ml four-neck round bottom flask equipped with a thermometer, condenser, mechanical stirrer, and a septum, add 209.39 g of D4; 10.45 g of PMHS; 0.95 g of dried bentonite (F-105 at 100 C. for four hours) and 0.333 g of hexamethyl disiloxane (HMDS) (432.9 µL). Fill the reaction flask with nitrogen. Slowly heat the mixture to 90° C. with 500 RPM stirring. Hold at 90° C. for 7 hours. The viscosity of the mixture should reach 6000 cps. To remove any unreacted D4, heat the mixture under high vacuum at 125° C. The viscosity of the mixture should reach 7000 cps. The hydride content of the copolymer is measured by proton NMR and is about 5 mole %.

Step 2 Reaction

Cool the reaction flask from step 1 to room temperature. Then add 129.3 g of 61.4% triacontene (e.g., Gulftene 30+, commercially available from Chevron, a mixture of alkene materials having an alpha-olefin content greater than 60%, and an average chain length of about 36) and 400 ml toluene (dried with molecular sieves) and DMS-VO5 (divinyl PDMS) if needed, to the reaction flask from step 1. Fill the reaction mixture with nitrogen. Heat to 75° C., measure infrared spectra (IR) of a solution aliquot to determine the amount of remaining hydride, and add 90 µL of PC072 (Platinum, 1,3-diethenyl-1,1,3,3-tetramethyldisiloxane complex) (time=0 min.). At 20 minutes add 90 µL of PC072 and measure the hydride content by IR. The ratio of the hydride peak at time t compared to the size of the peak at time=0 is taken as the hydride content (percent hydride; H %). Continue to add 90 µL every 20 minutes taking IR of the aliquot until H % reaches 25 to 30% from IR (no less than 40 min. addition; no more that 60 min. addition). When the H % reaches 25–30%, add 50 ml of hexene and 90 µL of PC072 (quench time=0 min.). At 30 minutes add another 90 µL of PC072. Continue monitoring by IR until the H % is below 10% (normally 1 hour). Extract a small sample for analysis (dry under vacuum separately).

Procedure for Adding Antioxidant

From step 2, add in 30% silicone oil (30000 cp), 10% Cyanox STDP, 2% Irganox 101, 3% Mark 2112 based on the amount of wax (if assumed 338 g wax is produced: 101.6 g Si-oil, 33.8 g STDP, 6.67 g 1010 and 10.14 g 2112) heat to 100° C. and stir until mixed (1 hour). Pour into oven dish, dry in explosion-proof oven (~75° C.) overnight.

The melt viscosity of the copolymer and, therefore, of the release agent composition, may be effectively influenced by controlling the crosslinking of the copolymer while it is being prepared. Crosslinking agents which may be used for this purpose include divinyl-terminated polydimethyl siloxane. This approach is useful when a higher molecular weight copolymer is desired. The result of this procedure is to increase the copolymer viscosity in a controlled manner making the flow rate of the copolymer wax product more controllable.

When a lower molecular weight copolymer is desired, from about 0.1 to about 0.5 weight percent (preferably about 0.26%) of a chain-stopper material may be added to the step 1 reaction. Effective chain-stoppers include any low molecular weight PDMS, such as hexamethyl disiloxane (HMDS). It is preferred that this reaction take place in the presence of bentonite.

After the step 2 reaction is completed, it is preferred that the reaction be quenched with a volatile low molecular weight 1-alkene (e.g., $C_2$–$C_{14}$ alkenes), such as 1-hexene. This quenching step replaces any hydrides in the material synthesized with the short alkyl chain to prevent further reaction of any hydrides, such as self-crosslinking. Up to about 30% of the y groups on the copolymer can be so substituted—greater amounts can adversely affect viscosity of the material.

It has surprisingly been found that when the effective amount of reaction catalyst (see step 2, above) is added stepwise to the reaction mixture over the course of the reaction, the reaction goes further toward completion than it the catalyst had all been added at one time. Therefore, the present invention encompasses the reaction for making a random silicone copolymer comprising reaction of a $C_{15}$–$C_{60}$ 1-alkene (preferably a $C_{30}$–$C_{45}$ alkene, most preferably $C_{36}$ alkene) with a methylhydrosiloxane-containing prepolymer (preferably a PDMS-containing prepolymer, more preferably a PDMS-co-PMHS prepolymer, most preferably one having a PDMS:PMHS molar ratio of about 32:1) in the presence of a Group VIII b catalyst material, for example those selected from platinum, palladium, and mixtures thereof (preferably platinum) wherein the catalyst is added to the reaction mixture in portions throughout the course of the reaction, until the reaction is complete. Since the 1-alkene is generally present in the reaction as a mixture of alkenes, it is preferred that it have a high purity (e.g., it should contain at least about 60% by weight of the desired alkene). It is also preferred that the reaction should be quenched with a short chain ($C_2$–$C_{14}$) 1-alkene (preferably n-hexene) when the reaction is complete. By "effective amount" of catalyst is meant the total amount of catalyst necessary to catalyze the reaction. The precise amount will depend on the identity of the specific catalyst and reactants used and will be within the knowledge of one skilled in the art.

A typical fuser assembly for use in an electrophotographic process comprises a heated roll structure including a hollow cylinder or core having a suitable heating element disposed in the hollow portion thereof which is coextensive with the cylinder. The heating element may comprise any suitable type of heater for elevating the surface temperature of the cylinder to operational temperatures which are generally from about 250° F. to about 400° F. (from about 115° C. to about 204° C.) and, for example, may be a quartz lamp. The cylinder may be fabricated from any suitable material capable of accomplishing the objects of the invention, that is, a material which not only will transfer heat to the surface to provide the temperature required for fusing toner particles, but also a material having a surface which is capable of interacting with the release compositions of the present invention to form an interfacial or barrier layer to toner between the release layer and the surface of the barrier fuser member to prevent toner particles from contacting the fuser surface.

Typical fuser member materials include anodized aluminum and alloys thereof, steel, stainless steel, nickel and alloys thereof, nickel-plated copper, copper, glass, zinc, cadmium, and the like, as well as various combinations of the above materials. The cylinder may also be fabricated from any suitable material which is nonreactive with the release agent compositions as long as the surface of the cylinder is coated with a material capable of accomplishing the objects of the present invention. Surface temperature of the fuser member many be controlled by means known to those skilled in the art, for example, by means described in U.S. Pat. No. 3,327,096.

In general, the fuser assembly further comprises a backup member, such as a roll or belt structure which cooperates with the fuser roll structure to form a nip through which a copy paper or substrate passes such that the toner images thereon contact the fuser roll structure. The backup member may comprise any suitable construction, for example, a steel cylinder or a rigid steel core having an elastomeric layer thereon, or it may be a suitable belt material which provides the necessary contact between the fuser member and the substrate carrying the developed latent image. The dimensions of the fuser member and the backup member may be determined by one skilled in the art and generally are dictated by the requirements of the particular electrophotographic apparatus in which the fuser assembly is employed, the dimensions being dependent upon the process speed and other parameters of the machine. Means may also be provided for applying a loading force in a conventional manner to the fuser assembly to create nip pressures on the order of from about 15 to about 150 psi average.

The fuser member treated with the release agent compositions of the present invention, said compositions being applied in an amount sufficient to cover the surface with at least a continuous, low surface energy film of the composition to prevent the nonreactive thermoplastic resin toner from contacting the surface of the fuser member and to provide a surface which releases the thermoplastic resin toner heated by the fuser member, is also a part of the present invention.

Finally, the present invention encompasses a pad used for dispensing the release agent of the present invention onto the fuser member. This pad comprises a felt pad constructed from a temperature resistant fiber impregnated (saturated) with an effective amount (e.g., about 6 to about 10 grams) of a release agent composition of the present invention.

The following examples are intended to illustrate the compositions and the methods of the present invention and are not intended to be limiting thereof.

EXAMPLE 1

A release agent composition of the present invention has the following components.

| Material | Parts (by wt.) |
| --- | --- |
| 3 mole percent Methyl-Triacontylsiloxane-97 mole percent Dimethylsiloxane Copolymer[1] | 100 |
| Silicone Oil, 30,000 centistoke | 30 |
| Cyanox STDP antioxidant (commercially available from Cytec Industries) | 10 |
| Irganox 1010 antioxidant (commercially available from Ciba Geigy) | 2 |
| Mark 2112 antioxidant (commercially available from Witco Corp.) | 3 |

[1]The copolymer of formula (1) wherein $x = 97$, $y = 3$, and R is about 75% $C_{36}$ alkyl and about 25% hexyl. The addition of more antioxidant to the composition increases thermal stability, but also reduces viscosity.

The above composition is made in the following manner: To the copolymer material dissolved in toluene, the silicone oil and antioxidants are added, heated to 100° C. and stirred for about 1 hour. The mixture is then poured into an oven dish and dried in an explosion-proof oven (~75° C.) overnight. This composition, when applied to the fuser roll an electrophotographic device, provides excellent release agent properties without streaking or otherwise adversely affecting the quality of the printed pages produced.

EXAMPLE 2

A composition of the present invention is prepared in the following manner.

Synthesis of PDMS-co-PMHS Prepolymer

In a flask equipped with a mechanical stirrer and condenser, octamethylcyclotetrasiloxane 110.2 g, polymethylhydrosiloxane (Aldrich 17,620–6) 3.1 g, acid leached bentonite (Grade F-20X) 0.32 g, and hexamethyldisiloxane 0.3 g, are added and degassed with Firestone Valve equipment. The mixture is heated to 90° C. for 18 hours, then cooled to room temperature. After cooling to room temperature, the product is analyzed by NMR and viscometry. (PDMS:PMHS=97:3 mole percent; viscosity at room temperature equals 4,000–8,000 cst).

Preparing the Crosslinked Siloxane Wax Copolymer

In a flask equipped with a mechanical stirrer and condenser, PDMS-co-PMHS (5,000 cst) 18.5 g, triacontene (66%; average C=36) 6.29 g, and toluene 60 mL, are added and degassed with Firestone Valve equipment. The mixture is heated to 60° C. to melt the triacontene and an aliquot of the mixture is collected and the % hydride is determined by infrared spectroscopy for the sample. Then 6 μL of platinum divinyl-terminated tetramethylsiloxane complex (PC072) is added. After addition, the temperature is raised to 70° C. After 15 minutes, another aliquot (% H by IR) is taken and at 20 minutes 6 μL of PC072 is added. After 30 minutes, another aliquot (% H by IR) is taken and at 40 minutes 6 μL of PCO72 is added. After 50 minutes, another aliquot (% H by IR: should be less than 30%) is taken and at 60 minutes, 5 mL of hexene and 6 μL of PC072 are added. After 90 minutes, 6 μL of PC072 is added and at 120 minutes a final aliquot is taken to assure % H is less than 10%. An aliquot is collected and dried under vacuum to determine the percent of the solid in the product. The final siloxane wax copolymer contains about 3% alkene and 97% siloxane. [A fluorinated copolymer may be prepared by substituting 10 mL 1H, 1H, 2H-perfluoro-1-hexene in place of hexene in the above reaction.]

To ensure the thermal stability of the siloxane copolymer wax at fusing temperature, some other additives are also mixed with the wax before using ill the fusing system. The composition comprises the following components: copolymer wax, described above; a primary antioxidant, Irganox 1010, commercially available from Ciba Geigy: 1.2 parts per 100 parts wax; a secondary antioxidant, Cyanox STDP (distearylthiodipropionate, commercially available from Cytek Industries): 6 parts per 100 parts wax; and a high temperature phosphite antioxidant, Mark 2112 (commercially available from Witco Corporation): 1.8 parts per 100 parts wax. These additives are added to the siloxane wax copolymer dissolved in toluene, stirred well and then poured into a dish and dried in a flame-proof oven at 80° C. overnight.

8.5 g of the composition is dispensed onto one side of a Nomex (DuPont) felt pad (fiber diameter=9 microns, felt density ≈55 oz/yd², length=213 mm, width=8 mm, depth=11 mm). The wax and felt are baked at 140° C. for 8 hours to ensure the wax is evenly distributed in the felt. Once baked, the side of the felt pad that the wax is initially dispensed upon is positioned in the wiper housing of an electrophotographic device such that this side contacts the fuser hot roll. The fuser hot roll is maintained at 200° C. This temperature melts the wax all the way through the wiper and this allows the wax to flow as a normal lubricant.

The composition, when used on a fuser roller in an electrophotographic process, prevents the sticking of toner particles to the fuser roll, lubricates the fuser roll during use, and does not result in streaking or other print quality defects in the printed pages produced.

EXAMPLE 3

A copolymer of the present invention useful as a sealant is synthesized as follows:

Step 1

In a 1000 mL four-neck round bottom flask equipped with thermometer, condenser, mechanical stirrer, and septum, add 213.05 g of D4, 1.93 g of PMHS, 0.62 g of dried bentonite (F-20X at 100° C. for four hours), and 0.744 g of HMDS (967 μL). Fill the reaction flask with nitrogen. Slowly heat the mixture to 90° C. with 500 RPM stirring. Hold at 90° C. for 18 hours. To remove any unreacted D4, heat the mixture under high vacuum at 125° C. The viscosity of the material should reach 5,000 cps. The content of hydride is measured by proton NMR and is about 1 molar percent.

Step 2

Cool the reaction flask from step 1 to room temperature. Then add 26.5 g of triacontene (e.g., Gulftene 30+, commercially available from Chevron, a mixture of alkene materials having an alpha-olefin content greater than 60%, and an average chain length of about 36) and 400 mL toluene (dried with molecular sieves). Fill the reaction mixture with nitrogen. Heat to 75° C., measure IR of a solution aliquot, and add 50 μL of PC072 (Platinum, 1,3-diethenyl-1,1,3,3-tetramethyldisoloxane complex) (time=0 min). At 20 minutes add 50 μL of PC072 and measure IR. Continue to add 50 μL every 20 minutes taking IR of aliquot until percent hydride (% H) reaches 25–30% of original (time=0 min.) hydride integration from IR (no less than 40 min. addition; nor more than 60 min. addition). When the % hydride reaches 25–30% add 50 mL of hexene and 50 μL of PC072 (quench time=0 min.). At 30 minutes add another 50 μL of PC072. Continue monitoring by IR until the % hydride is below 10% of original hydride integration (normally 1 hour).

Procedure for Adding Antioxidant

From step 2, add in 3% Cyanox STDP, 0.6% Irganox 1010, 0.9% Mark 2112 antioxidants based on amount of sealant (if assumed 241.3 g sealant: 7.24 g STDP, 1.45 g 1010, and 2.17 g 2112). Heat (100° C.) and stir until mixed (1 hour). Pour into oven dish, dry in explosion proof oven (~75° C.) overnight.

A small quantity of the material synthesized above is used to seal the ends of the developer roll in the developer section of the printing cartridge. This sealing operation prevents the toner from leaking into the transfer section of the cartridge. The material is inside the cartridge where it cannot be touched by the customer; it is not released during the printing process.

To apply the material, the cartridge assembly person takes a small amount of the material (about 40 mg) on the end of a tool that is like a flat screwdriver and places that amount of material on each end of the developer roll and on the J-seal. The roll is then turned to distribute the material around the roll, forming a thin layer, sealing the ends of the roll and the J-seal to prevent toner from escaping.

What is claimed is:

1. A fuser roll for use in an electrophotographic process comprising on the surface of said fuser roll an amount effective for release of toner of a heat stable silicone copolymer having structural units of the formulae:

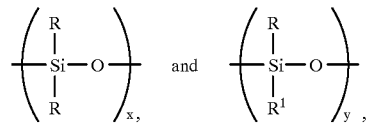

wherein (i) each R is independently a $C_1$–$C_6$ alkyl, (ii) each $R^1$ is independently selected from the group consisting of a $C_2$–$C_{14}$ alkyl and a $C_{15}$–$C_{60}$ alkyl, with the proviso that from about 70% to about 100% of all $R^1$ groups are $C_{15}$–$C_{60}$ alkyl, and (iii) x represents from about 75.0 to about 98.5 mole percent, and y represents from about 1.5 to about 25.0 mole percent of the silicone copolymer, based on total moles of the silicone copolymer.

2. A release agent composition in accordance with claim 1 wherein said silicone copolymer is a block copolymer or a random copolymer.

3. A release agent composition in accordance with claim 2 wherein said silicone copolymer is a random copolymer.

4. A release agent composition in accordance with claim 3 wherein said silicone copolymer is terminated with groups having the formulae:

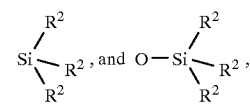

wherein each $R^2$ is independently a $C_1$–$C_6$ alkyl or aryl group.

5. A release agent composition in accordance with claim 4 wherein R is a methyl group.

6. A release agent composition in accordance with claim 4 wherein $R^2$ is a methyl group.

7. A release agent composition in accordance with claim 4 wherein said silicone copolymer has a weight average molecular weight from about 10,000 to about 1,000,000.

8. A release agent composition in accordance with claim 7 wherein said silicone copolymer has a weight average molecular weight from about 80,000 to about 250,000.

9. A release agent composition according to claim 8 having a viscosity of from about 2,000 to about 10,000 centipoise at about 93° C.

10. A release agent composition according to claim 9 having a melting point of from about 45° C. to about 80° C.

11. A release agent composition according to claim 10 which contains from about 50% to about 97% of said copolymer.

12. A release agent composition according to claim 11 which additionally comprises from about 0.5% to about 30% of a viscosity modifier.

13. A release agent composition according to claim 12 wherein said viscosity modifier is selected from the group consisting of amorphous silica, silicone oil, and mixtures thereof.

14. A release agent composition according to claim 11 which additionally comprises from about 3% to about 20% of an antioxidant.

15. A release agent composition according to claim 14 wherein the antioxidant is a mixture of hindered phenol, phosphite and thiodipropionate antioxidants.

16. A release agent composition according to claim 11 wherein x represents from about 85 to about 98 mole percent and y represents from about 2 to about 15 mole percent of the silicone copolymer.

17. A release agent composition according to claim 16 wherein the major component of $R^1$ is $C_{30}$–$C_{45}$ alkyl.

18. A release agent composition according to claim 17 wherein x is about 97 mole percent and y is about 3.0 mole percent of the silicone copolymer.

19. A release agent composition according to claim 18 wherein the major component of $R^1$ is $C_{36}$ alkyl.

20. A pad used for dispensing a release agent in an electrophotographic process comprising a felt pad constructed from a temperature resistant fiber saturated with from about 6 to about 10 grams of a release agent composition suitable for use on the hot fuser roll of an electrophotographic process, comprising an effective amount of a heat stable silicone copolymer having structural units of the formulae:

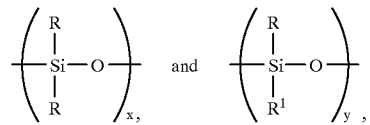

wherein (i) each R is independently a $C_1$–$C_6$ alkyl, (ii) each $R^1$ is independently selected from the group consisting of a $C_2$–$C_{14}$ alkyl and a $C_{15}$–$C_{60}$ alkyl, with the proviso that from about 70% to about 100% of all $R^1$ groups are $C_{15}$–$C_{60}$ alkyl, and (iii) x represents from about 75.0 to about 98.5 mole percent, and y represents from about 1.5 to about 25.0 mole percent of the silicone copolymer, based on total moles of the silicone copolymer.

21. A fuser roll in accordance with claim 1 in which said R of said silicone copolymer is methyl.

22. A fuser roll in accordance with claim 2 in which said R of said silicone copolymer is methyl.

23. A fuser roll in accordance with claim 3 in which said R of said silicone copolymer is methyl.

* * * * *

UNITED STATES PATENT AND TRADEMARK OFFICE
CERTIFICATE OF CORRECTION

PATENT NO : 5,959,056
DATED : September 28, 1999
INVENTOR(S) : Bradley L. Beach, et al.

It is certified that error appears in the above-identified patent and that said Letters Patent is hereby corrected as shown below:

Col. 14, claims 2 through 8, line 1
  Change "release agent composition" to read -- fuser roll --.

Col. 15, claims 9 through 19, line 1
  Change "release agent composition" ro read -- fuser roll --.

Signed and Sealed this

Twenty-seventh Day of March, 2001

Attest:

NICHOLAS P. GODICI

Attesting Officer   Acting Director of the United States Patent and Trademark Office